E. G. PADDECK.
AUTOMATIC WIRE TIER FOR BALING PRESSES.
APPLICATION FILED MAR. 13, 1916.
1,236,751.
Patented Aug. 14, 1917.
7 SHEETS—SHEET 2
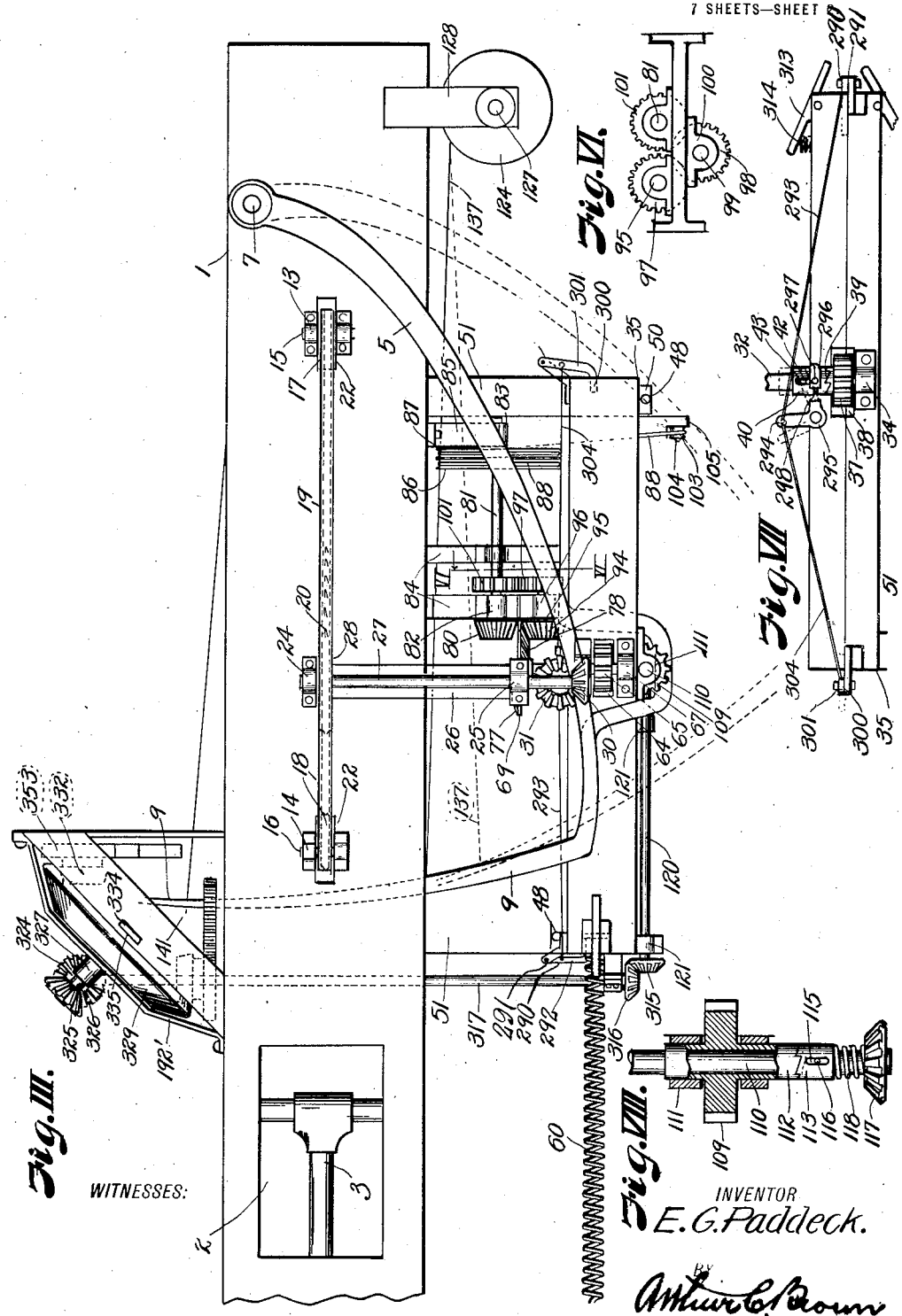
WITNESSES:
INVENTOR
E. G. Paddeck.
ATTORNEY E. G. PADDECK.
AUTOMATIC WIRE TIER FOR BALING PRESSES.
APPLICATION FILED MAR. 13, 1916.
1,236,751.
Patented Aug. 14, 1917.
7 SHEETS—SHEET 3.
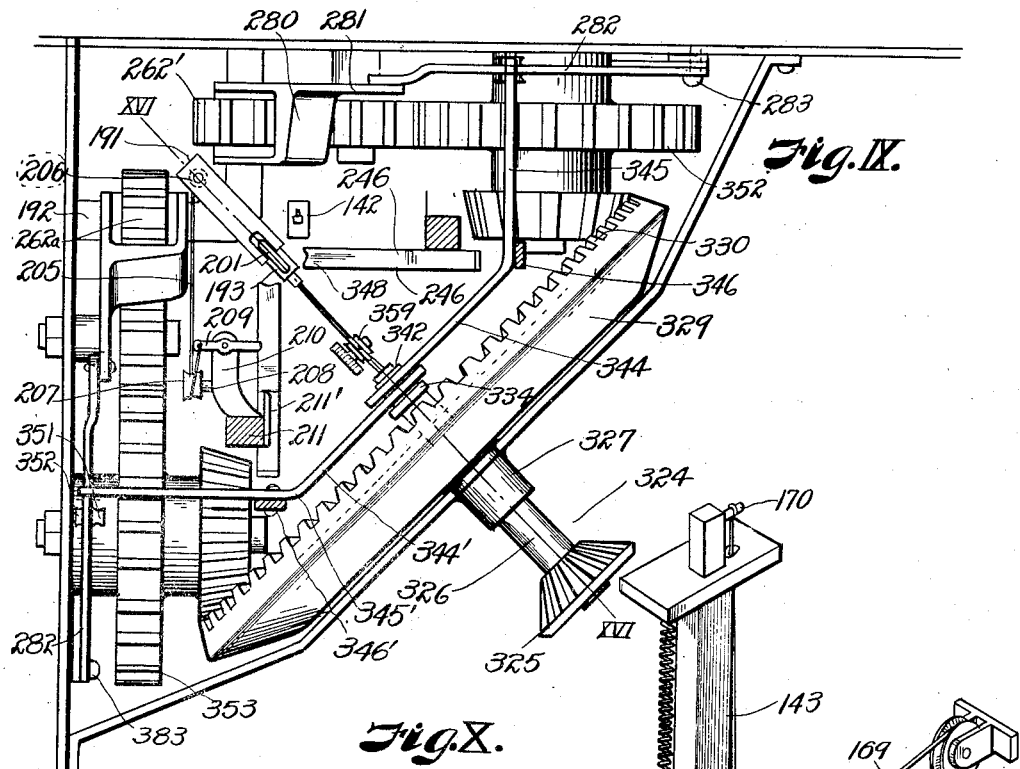
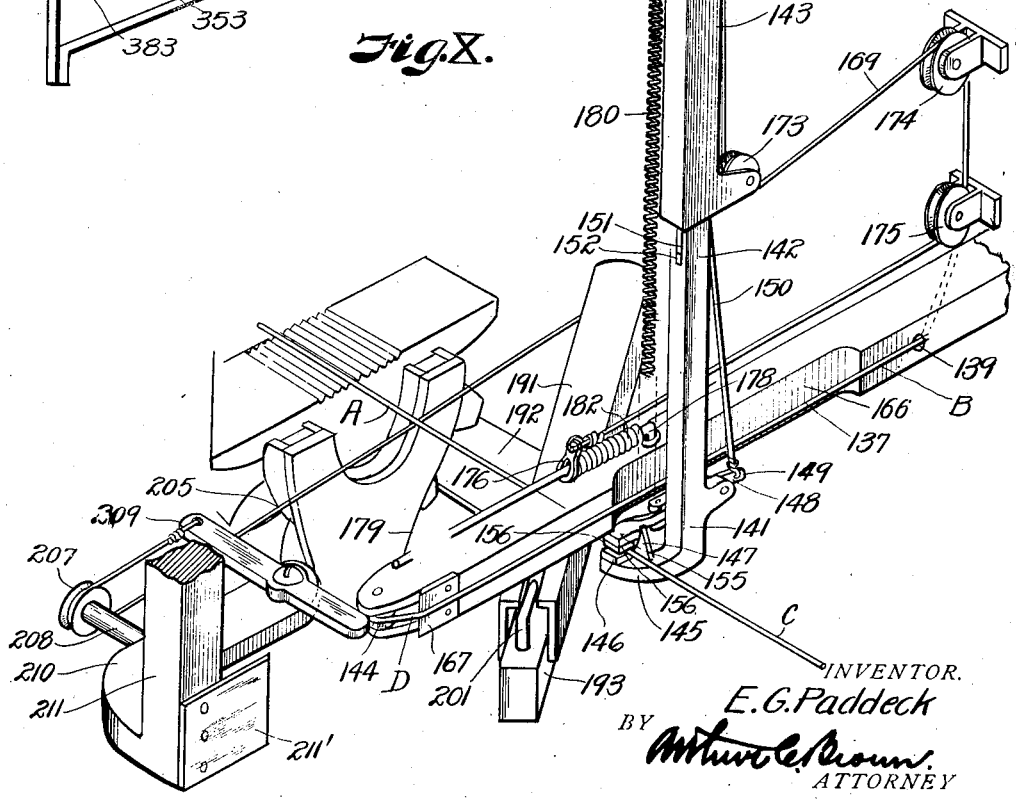
INVENTOR.
E. G. Paddeck
BY
Arthur C. Brown
ATTORNEY

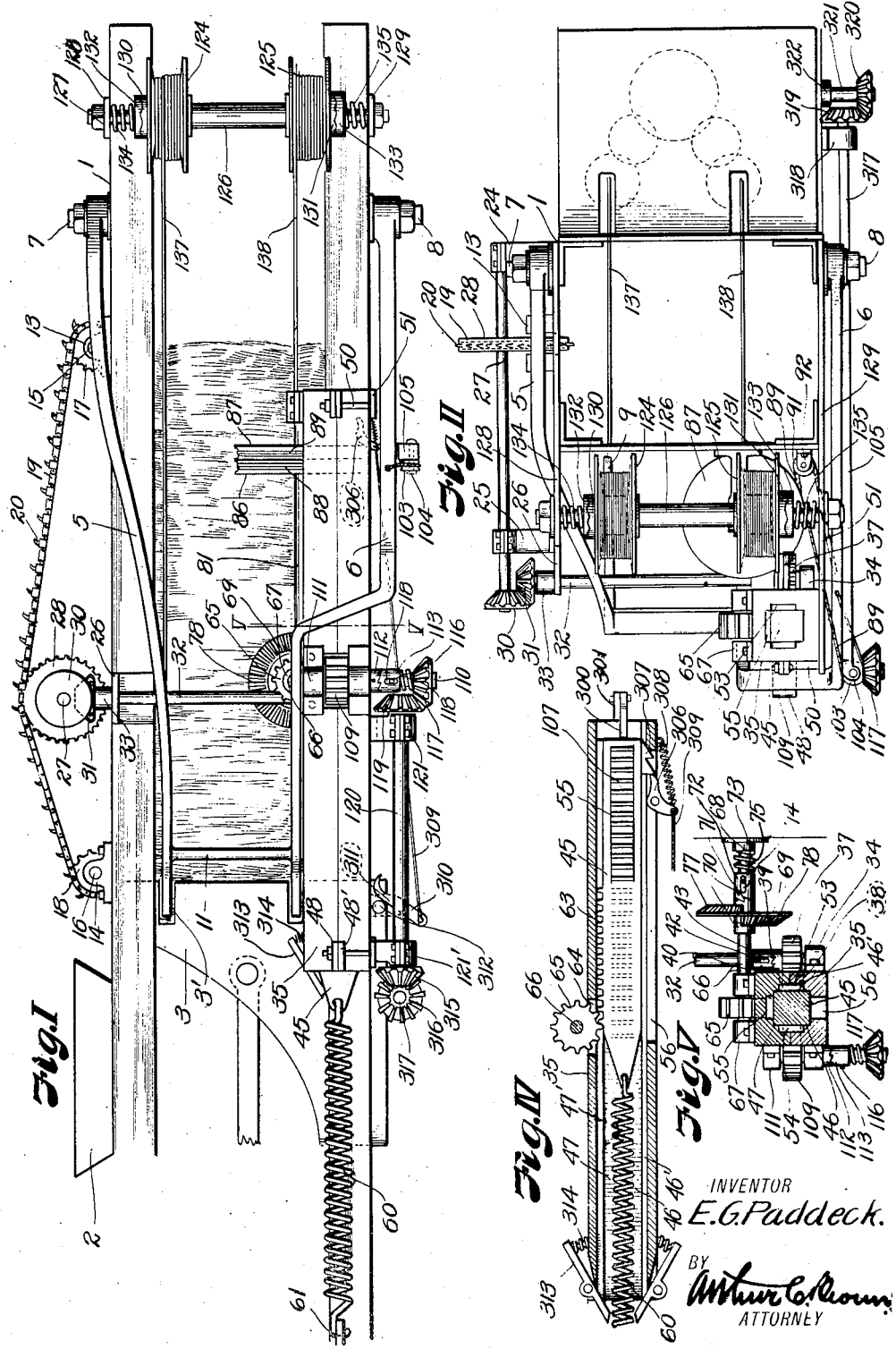

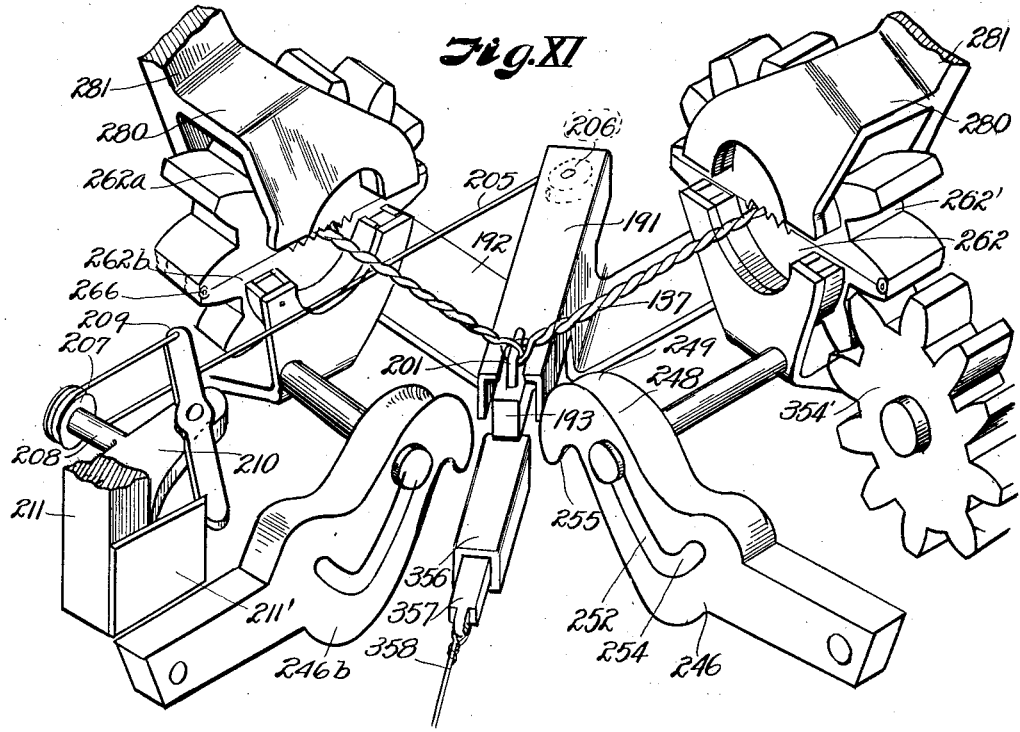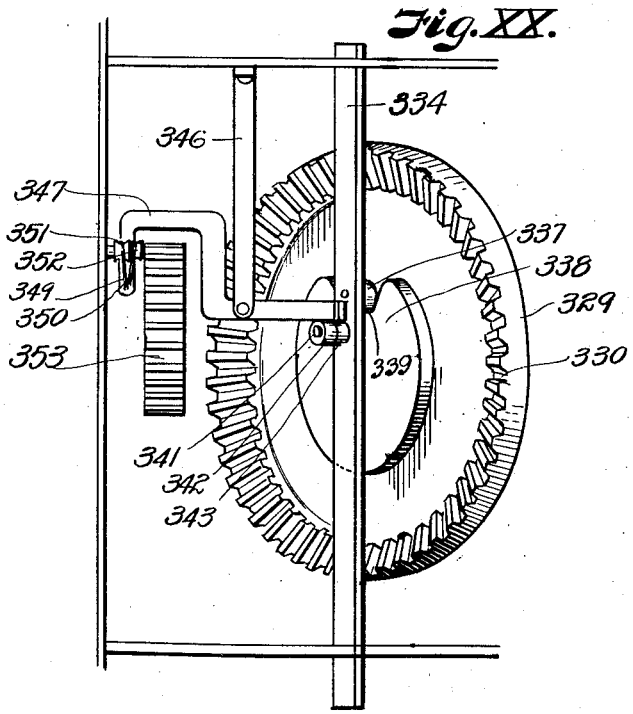

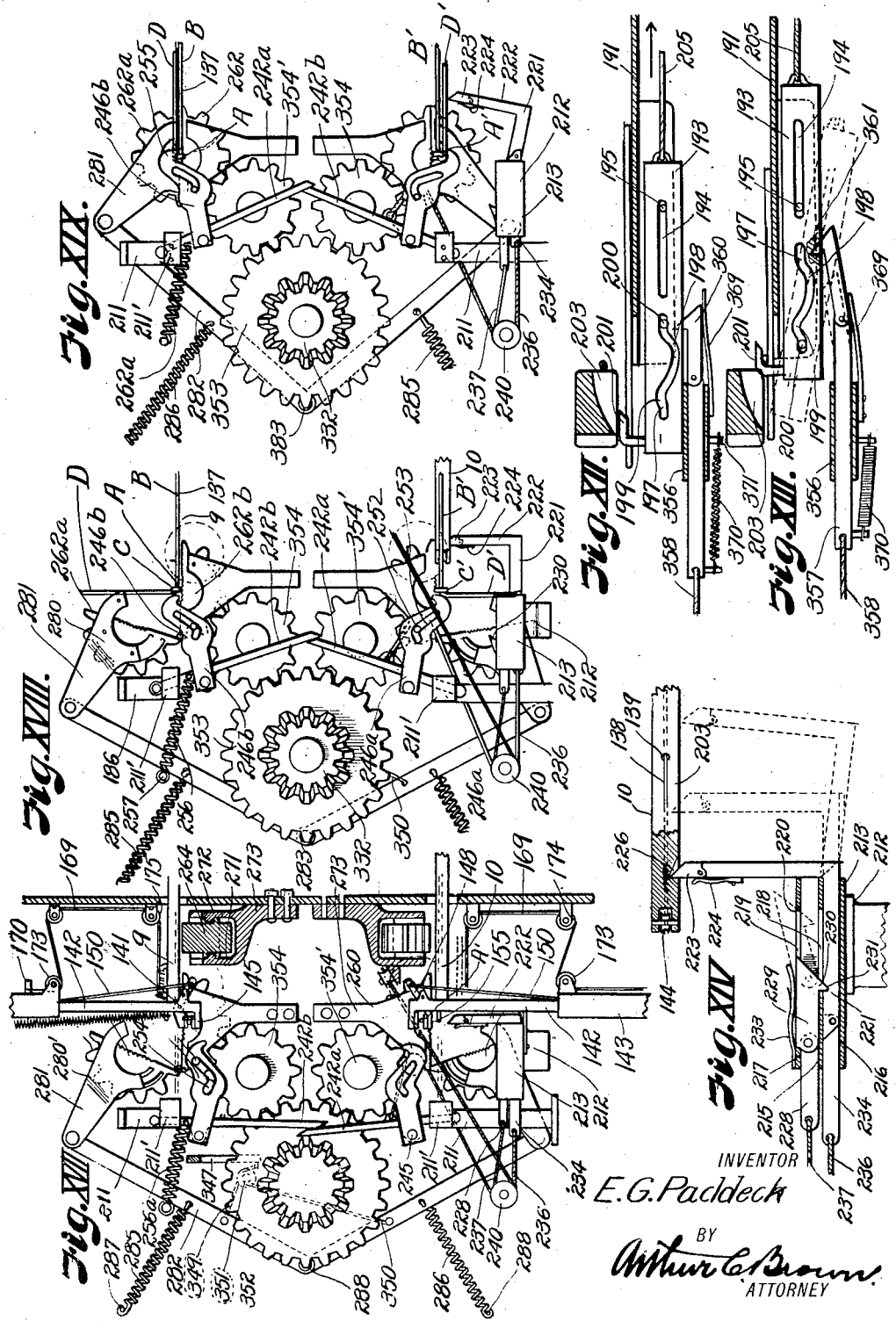

E. G. PADDECK.
AUTOMATIC WIRE TIER FOR BALING PRESSES.
APPLICATION FILED MAR. 13, 1916.
1,236,751.
Patented Aug. 14, 1917.
7 SHEETS—SHEET 6.
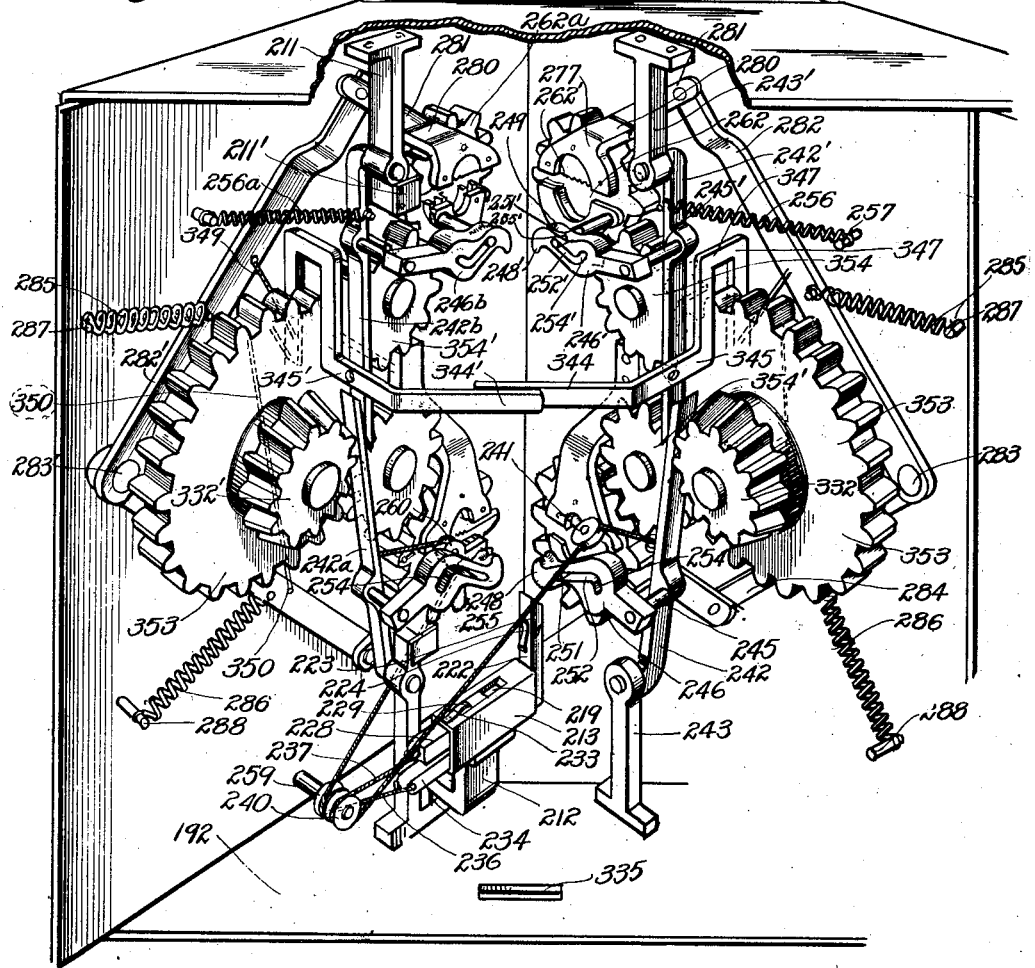
Fig. XV.
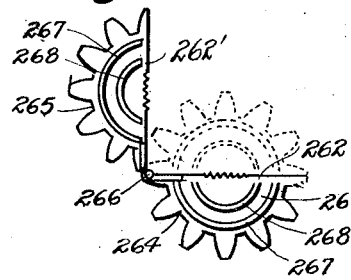
Fig. XXI.
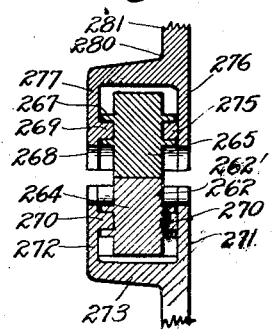
Fig. XXII.
INVENTOR
E. G. Paddeck.
BY
Arthur C. Brown,
ATTORNEY E. G. PADDECK.
AUTOMATIC WIRE TIER FOR BALING PRESSES.
APPLICATION FILED MAR. 13, 1916.
1,236,751.
Patented Aug. 14, 1917.
7 SHEETS—SHEET 7.
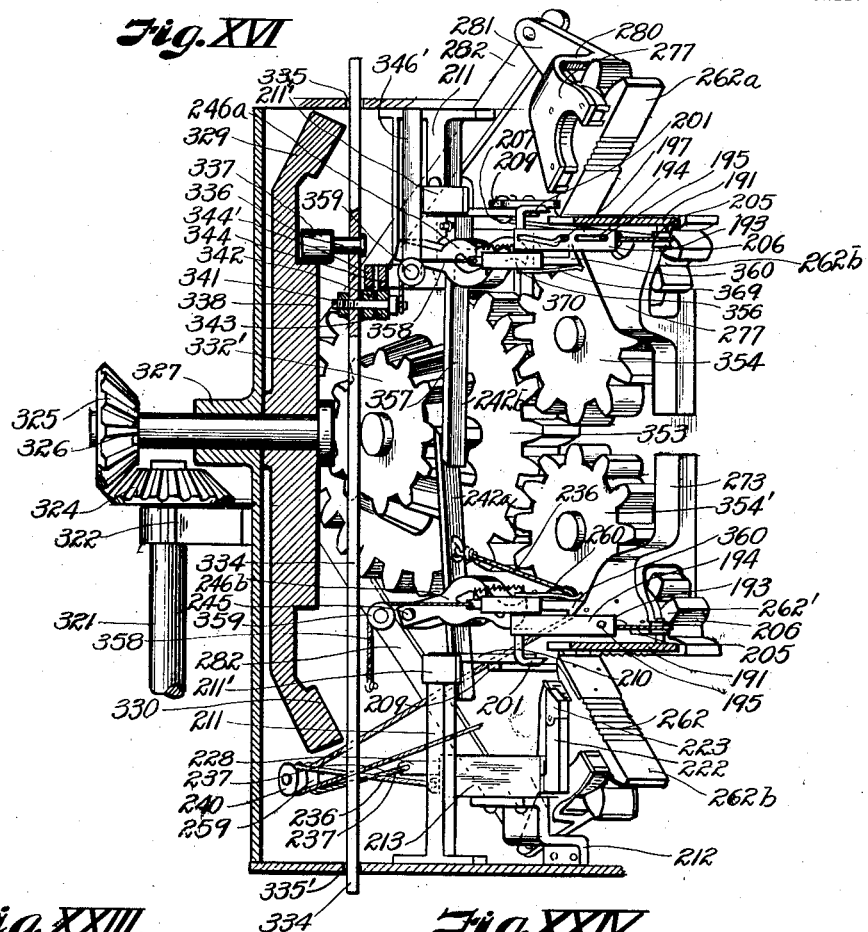
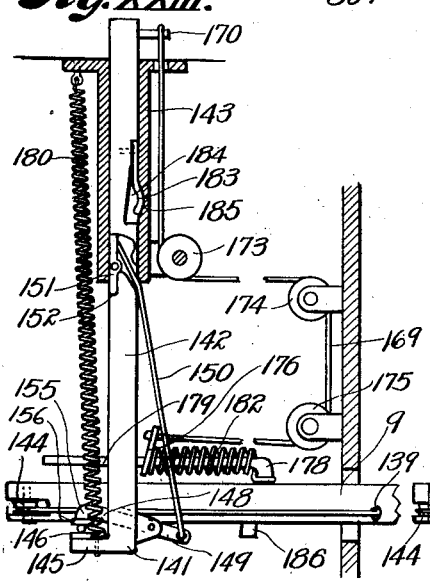
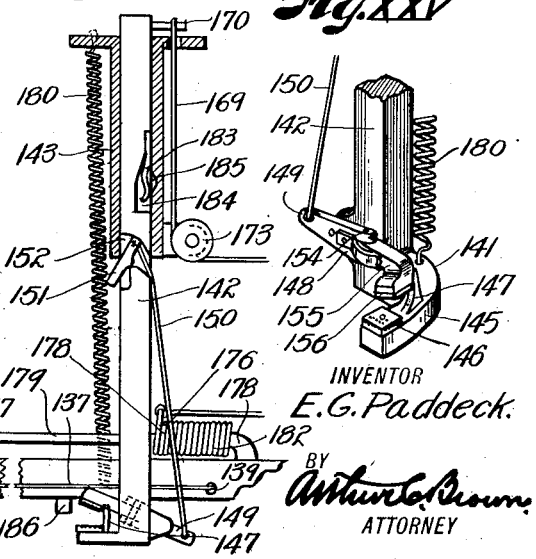
INVENTOR
E. G. Paddeck.
BY
Arthur C. Brown
ATTORNEY

UNITED STATES PATENT OFFICE.

EDWARD G. PADDECK, OF KANSAS CITY, MISSOURI.

AUTOMATIC WIRE-TIER FOR BALING-PRESSES.

1,236,751.   Specification of Letters Patent.   Patented Aug. 14, 1917.

Application filed March 13, 1916. Serial No. 83,950.

*To all whom it may concern:*

Be it known that I, EDWARD G. PADDECK, a citizen of the United States, residing at Kansas City, in the county of Jackson and State of Missouri, have invented certain new and useful Improvements in Automatic Wire-Tiers for Baling-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an automatic bale tier, and more particularly to an apparatus for tying bales of hay, straw, or other material, automatically during the baling process.

This object is accomplished by mechanism comprising needles for running wires transversely through the baling case of a press and holding the wires at opposite sides of the case, so that as the bale is pushed forwardly the wires are fed to inclose the bale. Mechanism operable by the traveling bale is provided for actuating the needle at proper intervals relative to the desired length of a bale, and other mechanism provided for taking the wires from the needles and twisting the same to tie the wires about the bale.

The preferred form of mechanism for accomplishing the above and other objects of the invention is illustrated in the accompanying drawings, wherein:—

Figure I is a side view of part of the baling case of a press equipped with my tying apparatus.

Fig. II is an end view of the same.

Fig. III is a plan view of the same, showing the needles in projected position in which the wires are crossed to permit the tying of the ends of the wires.

Fig. IV is a detail side elevation of the needle operating shuttle and part of its tripping mechanism.

Fig. V is a cross section on the line V—V, Fig. I, illustrating the shuttle and its associated parts.

Fig. VI is a vertical section on the line VI—VI, Fig. III.

Fig. VII is a detail elevation of the shuttle clutch and trip mechanism.

Fig. VIII is a detail side elevation of the clutch transmission from the shuttle to the tying members.

Fig. IX is an enlarged plan view of the wire tying parts.

Fig. X is an enlarged detail perspective of a part of a needle, the wire clamping plate, the upper wire clutch and a clutch actuating lever, the parts being duplicated for upper and lower members of the needle.

Fig. XI is a similar view of the same parts showing the wire-turning jaws in operative position.

Fig. XII is a side elevation, partly in section, of the clamp for holding a tie wire in crossed relation, and the mechanism for operating the clamp; the parts being shown in idle position.

Fig. XIII is a similar view of the same parts in operative position.

Fig. XIV is a side elevation, partly in section, of the mechanism for actuating the hinged wire twisting jaws from a needle.

Fig. XV is a perspective view of the wire-tying mechanism, looking from the interior of the apparatus, the driving wheel and wire clamps being removed, showing the parts in functional position.

Fig. XVI is a sectional view on the line XVI—XVI, Fig. IX, particularly illustrating the driving wheel and the cam bar for setting the wire clutches.

Fig. XVII is a side elevation of a wire-tier set in idle position.

Fig. XVIII is a similar view showing the wires turned on each other.

Fig. XIX is a similar view showing the clutches closed ready to wrap the wires.

Fig. XX is a detail view of the inner face of the driving gear and the cam wheel.

Fig. XXI is a detail view of the split gear wheel clutch.

Fig. XXII is a transverse section of the same and its mounting.

Fig. XXIII is a side view of a wire clutch and its operating members just before its final movement to release the wire therefrom.

Fig. XXIV is a similar view showing the jaws released.

Fig. XXV is a perspective view illustrating the clutch jaws.

Referring more in detail to the drawings:

1 designates the baling case of a hay or other press of any ordinary type, comprising the hopper 2 into which material to be baled is fed, and the plunger 3 whereby the material is forced, through the case to effect proper compression of the material and induce the forward feed.

Pivotally mounted at their butt ends on studs 7—8 on the top and bottom of the baling case 1, are arms 5—6 which have curved points 9—10 at their forward ends directed toward the case and of such length that they may extend entirely therethrough and beyond the side of the case opposite that through which they enter. The needle arms 5—6 are rigidly connected by a rib 11 near the bases of the points.

Referring first to the mechanism for reciprocating the needles in order to carry the wire transversely through the case 13—14 designate bearings that are mounted on the top of the case 1, preferably at the transverse center of the case and in longitudinal alinement and spaced relation.

Rotatably mounted in the bearings 13—14 are shafts 15—16, and fixed on said shafts are sprocket wheels 17—18, over which is run a chain belt 19, the links of which carry outwardly projected teeth 20. The top of the baling case is provided with a longitudinal slot 22 through which the tooth chain enters the interior of the case, and the teeth are so arranged in the chain that they face backwardly, with the result that as a bale of hay or other material passes forwardly through the case the chain is carried along therewith, and it is by movement of the chain thus induced that the needle is actuated and the bale wire tied.

Rotatably mounted in bearings 24—25 (Fig. II) on a plate 26 that is fixed to the top of the baling case and extends transversely beyond one of the vertical sides thereof, is a shaft 27, and fixed on said shaft is a sprocket wheel 28 that engages the toothed belt 19 that is operated thereby to revolve the shaft 27. The shaft 27 carries at its outer end a beveled gear wheel 30, and meshing with said wheel 30 is a beveled gear wheel 31 on the vertical shaft 32 which is revolubly mounted in an upper bearing 33 on the plate 26 and in a lower bearing 34 on the side of a shuttle housing 35 and has a clutch face 39 (Figs. V-VII) that is adapted for engagement with a mating clutch face on a collar 40 that is slidably keyed on the shaft 32 by a pin 42 on the shaft and a slot 43 in the collar.

The shuttle member comprises a reciprocatory bar 45 which is mounted in the housing 35 to slide in the ways 46—46' in the bottom member of the housing and in the ways 47—47' in the upper housing member; the said housing member being divided horizontally and having laterally directed lips 48—48' on its upper and lower portions respectively, through which the bolts 50 are extended to hold the housing members in place, the said bolts being also extended through the projecting portion 51 of the baling case to anchor the shuttle housing position.

The shuttle housing is provided with inner and outer side channels 53—54 and with the top channel 55 for accommodating racks hereinafter mentioned, and at the bottom with a slot 56 through which a latch element on the shuttle is accessible. The inner shuttle rack 53 is adapted for travel past the slot 38 in the inner face of the housing, and constantly meshes with the gear wheel 37 having clutch mounting on the shaft 32 that is operable upon the forward movement of the bale in the baling case, so that when the bale moves forwardly the shuttle is carried forwardly with it, the shuttle moving against the tension of a spring 60 that is connected with the rear end of the shuttle and with a hook 61 on the baling case, so that the shuttle is automatically returnable when released from its driving connection with the operating shaft.

The needle is operated directly from the shuttle by means of a rack 63 (Fig. IV) on the upper face of the shuttle, which extends from the rear end of the shuttle to about the longitudinal center thereof, so that the needle is operated during only about one half the travel of the shuttle.

Extending through a slot 64 in the top of the shuttle housing in position for meshing with the rack 63 is a gear wheel 65 that is fixed on a shaft 66 which is rotatable in bearings 67 (Figs. I, II, and III) on the shuttle housing and in an end bearing 68 on the side of the baling case.

Rotatably mounted on the shaft 66 is a beveled gear wheel 69 of peculiar construction, which is held against outward movement along the shaft by a collar 70 that is fixed on the shaft and has a clutch face 71 at its inner side adapted for clutch engagement with a sleeve 72 that is keyed to the shaft by a pin 73 that projects through a slot 74 in the sleeve; the said sleeve being yieldingly urged to clutch engagement with the beveled gear wheel by a spring 75 that surrounds the shaft and bears against the bearings 68 and the end of the sleeve.

The beveled gear wheel 69 has teeth 77 on the side facing the baling case, that extends half way around the wheel and teeth 78 on its outer side extending throughout the other half of the wheel, i. e., the teeth 77 are on one side face of the wheel above the horizontal diameter and the teeth 78 on the other side face and below the horizontal diameter when the parts are in neutral position. The gear segment 77 is adapted to mesh with the beveled gear wheel 80 (Fig. III) that is revolubly mounted in a bracket 84 on the side of the baling case and connected with the needle arm 6, so that when the shaft 81 is revolved upon initial movement, the cable 88 is wound up on the drum and pulls the arm toward the baling case to effect movement of the needle point toward the tying mechanism.

To reverse travel of the shaft 81 to return the needle to initial position, the gear segment 77 leaves its contact with the pinion 80 so that the pinion and shaft 81 are idle relative to the driving gear wheel and the gear segment 78 immediately meshes with a beveled pinion 94 that is fixed on a shaft 95, that is revolubly mounted in a bearing 96 on the bracket 84 and has a gear wheel 97 fixed to its opposite end.

The gear wheel 97 meshes with an idler 98 (Fig. VI) that is fixed on a shaft 99, carried by suspended bearings 100 on the bracket 84, and which meshes with the gear wheel 101 that is fixed on the shaft 81, so that as the segmental gear wheel 69 continues to revolve in the same direction as previously described, the segment 78 takes up the driving function through its idler connection with the shaft 81 and moves the shaft in a direction opposite to that heretofore traced. Upon the movement of the shaft 81 in such opposite direction the cable 89 is wound on the drum 87. The cable 89 is run over a grooved wheel 103 on a shaft 104 that is mounted on an arm 105 extended from the baling case, and the end of the cable is attached to the needle arm 6; the grooved wheel being located at the outside of the needle, so that when the cable 89 is wound on the drum, the needle is returned to initial position. In this way the needle is moved forwardly and back, through the baling case to carry the wire to the tying mechanism, the parts moving through the slots 3′ in the plunger 3, which is in compression contact with the rear of the bale when the needle operates.

The rack 63 on the shuttle is only of sufficient length to induce a complete revolution of the segmental gear wheel 69 and occupies preferably about one-half of the length of the shuttle.

The shuttle also carries a rack 107 which is arranged on the side of the shuttle at the forward end thereof; the rack 107 beginning at the end of the rack 63, so that movement of the parts actuated through the rack 63 may have been completed before the parts are operated by the rack 107; it being repeated, however, that forward movement of the shuttle induces no operation of the needle, as the gear wheel travels idly upon forward movement of the shuttle and is operated upon the quick return movement of the shuttle under tension of the spring.

The rack 107 meshes with a horizontal gear wheel 109 that is revolubly mounted on a shaft 110 mounted in bearings 111 on the side of the shuttle housing, and has an extended clutch collar 112 (Fig. VIII).

Slidably mounted on the shaft 110 is a collar 113, having a slot 115 through which a pin 116 is projected to key the collar 113 to the shaft 110.

A beveled gear wheel 117 is fixed on the lower end of the shaft 110, and surrounding the shaft between the gear wheel and clutch collar 113, is a spring 118 which yieldingly urges the collar 113 to operative engagement with the clutch collar 112 that is turned with the gear 109. The beveled gear wheel 117 meshes with a beveled gear wheel 119 on a shaft 120 that is revolubly mounted in bearings 121—121′ that are suspended from the shuttle housing; the shaft having driving relation with the wire-tying parts presently described.

The rack faces of the shuttle are so arranged that following the actuation of the needle by the rack 63 the horizontal gear wheel 109 meshes with the rack 107 at the forward end of the shuttle to operate the wire-tying parts.

These parts do not, however, perform their work until the needle has passed forwardly and back in order to place the wire in position for application to the bale.

The tie wires for the bale are carried on spools 124—125 (Figs. I and II) on a sleeve 126 which is revolubly mounted on a shaft 127 carried by plates 128—129 mounted on the baling case, the said spools being spaced and having projecting hubs 130—131 provided with corrugated outer faces.

Slidably mounted on the shaft 127 above and below the spools are heads 132—133 having corrugated faces adapted for meshing with the like faces on the spool hubs, and surrounding the shaft and bearing against the plates 128—129 and against the heads 132—133 are expansion springs 134—135 which yieldingly urge the heads toward the spools, so that the corrugated faces are yieldingly held in mesh.

It is apparent that with this construction the spools are held against automatic displacement to prevent slack in the tie wires, but may be revolved to pay out the wires when the apparatus is in operation. The spools carry the separate strands of tie wires 137—138 which are run forwardly to the needle points 9—10 and are strung through horizontal and outwardly inclined apertures 139 therein and caught in a clutch hereinafter described in detail.

While I employ two needle points for carrying separate wire strands so that the bales may be tied adjacent the tops and bottoms of the bales, the mechanism for tying the wire at each needle point is identical with that of the other, so but one set will be described in detail, with the understanding that the description relates equally to both.

When the wire 137 is run through its needle point aperture 139 it is caught in the clutch head 141 and held by the jaws thereon, so that when the needle point is drawn back out of the baling case, the wire is held and lies horizontally across the baling case. With the wire so held, when the hay, or other material to be baled, is forced forwardly through the baling case, it engages the wire and moves the same backwardly, so that the wire being held in the clutch head 141 cannot give, but being free on the spools will pay out from the spools and run over the grooved wheels 144 on the ends of the needle points; it being apparent that when the bale is of sufficient length, and the needle is again operated, the wire is carried back behind the bale, so that the wire is run entirely about the bale, and when tied in the tying mechanism, will hold the bale together.

The clutch for holding the free end of the wire comprises an arm 142 that is slidably mounted in a housing 143 secured to the upper plate of the gear case and extends downwardly adjacent the needle and is provided at its lower end with the clutch head 141.

The clutch head comprises a stationary lower jaw 145 turned inwardly at its end and has a pivotally mounted gripping head 146 and provided with an arm 147 curved from the edge adjacent the disk and extended outwardly and upwardly. Pivotally mounted on the arm 142 above the jaw 145 is a lever 148 having an outwardly extending arm 149 and secured at the end thereof is a cable 150 which is carried upwardly and secured to one end of a latch 151 that is pivotally mounted in a pocket 152 in the arm 142.

The inner end of the lever 148 is provided with a yoke 154 and pivotally mounted in said yoke is an arm 155 having a pivotally mounted gripping head 156 adapted for coöperation with the gripping head 146 on the lower jaw and for engagement with the curved arm 147 so that when the lever is rocked on its mounting the arm 155 will be moved toward the fixed arm 145 and the head 146 will ride over the curved arm 147 to rock the arm 145 on its pivotal mounting in the lever yoke, so that the head is moved in the direction of the needle and over its coöperating gripping head, thereby effecting movement of the head 156 over the wire 137 and movement of the head against the wire to force the wire against the head 146 to effect the clutch.

In order to facilitate the clutching of the wire as described, I space the wire from the edge of the needle point at the end of the point by cutting the latter back adjacent the aperture 139 to provide a recess 166 in the rear of the needle point; the wire being also spaced from the needle point by the blade 167 presently described.

Means for operating the clutch to clamp and to release the wire at the proper time and to raise and lower the same in and out of the twisting jaws, comprises a cable 169 which is attached to a pin 170 at the upper end of the sliding clutch arm 142 and is run over a pulley 173 at the lower end of the housing 143 and over like pulleys 174—175 secured on the side plate of the baling case, and is provided at its lower end with a ring 176.

Mounted on the needle near the end thereof, is a catch 178 comprising an arm 179, which extends forwardly parallel with the needle point and is adapted, when the needle is carried within the tying case to pass within the ring 176 to carry the same forward therewith, so that the arm 142 will be drawn downwardly to bring the wire carried by the clutch 141 beneath the path of the needle so that the primary strand and the strand across the rear of the bale will be crossed and in position for a tying operation to be performed.

In order that the parts may operate successfully, it is found necessary that the wire be held clamped between the jaws 146—156 until just before the cutting of the needle strand; the cutting of the strand taking place when the plunger 3 is in its forward position and the bale is under compression which relieves the wire of any strain, so that when released by the clutch it is not drawn out of its functional position.

When threading the machine at the starting of a baling operation, the primary strand is threaded through the needle aperture 139 and drawn through the baling case, to be caught by an oncoming bale, and secured in a clutch 141.

The clutch arm at this time is yieldingly held in its upper position by a coil spring 180 that is secured to the lower jaw arm 145 and to the upper frame plate, but as the needle enters to inclose the bale, the arm 142 is carried downwardly by the ring and cable mechanism and places the primary strand beneath the path of the needle, it is not desired, however, to release the wire from the clutch until just before the cutting operation is performed, but it is necessary that the wire be carried beneath the path of the needle before the needle passes thereover, in order that it may be clamped before being cut and during the twisting operation later described.

It will be seen that the clutch is held closed about the wire-strand by the cable 150 which is attached to the pivoted arm 151; the said arm, during the greater part of the travel of the arm 142, lying within the casing 143, but when its pivotal point is carried beneath the housing 143, the arm will rock on its pivot, allowing the cable 150 to slacken and release the jaw from its clamping position.

In order that the clamp jaw will not release until the proper position of the needle is reached, I provide the arm 178 with a coil compression spring 182 which is wound thereabout and terminates near the end of the arm 179 and has sufficient resistance against compression, so that when the ring 176 is caught thereby, the arm 142 will be carried downwardly against the tension of the spring 180 and will carry the primary needle strand beneath the part of the incoming needle where the downward movement of the arm 142 is momentarily stopped by the action of a latch spring 183 (Figs. XXIII—XXIV), secured in a pocket 184 in the arm 142 and which takes into a notch 185 in the housing 143; the latch being placed so that the downward movement of the arm 142 will be checked before the release of the cable arm 151 from the housing 143.

As the needle advances, after the seating of the latch 183, the spring 182 is compressed about the arm 179, but just prior to the final forward movement of the needle, the spring is compressed to its limit, this causes a strain on the cable 169, which will overcome the pressure of the spring latch 183 and unseat the same from the notch 184, allowing the arm 142 to again be carried downwardly so that the arm 151 is carried beneath the housing 143 where it will rock on its pivotal mounting to slacken the cable 150 and release the primary strand from the clamp head; the strand then being carried out of the jaws by the contact of a boss 186 on the needle and placed over a clamping plate later described.

With the outward movement of the needle, the cable 169 is slackened and the spring 180, raises the arm 142 causing the latch arm 151, to again be carried within the housing 143, rocking on its pivot and tightening the cable 150 to close the clamping jaws about the secondary strand of wire and to raise the same out of the twisting jaws later described.

As a means for holding the wires to prevent their springing out of position after being released by the clutch and to hold the strands crossed during the tying operation, I have provided a clamping means which preferably comprises an inverted channel plate 191 (Figs. IX to XIII inclusive) which is fixed on brackets 192 on the baling case and extends diagonally relative to the path of the needle and the path of the tie wire, and is so arranged that the primary longitudinal and ultimate transverse strands of the wire cross over the outer end of the channel.

Slidably mounted within the channel is a bar 193, having a straight longitudinal slot 194 into which a pin 195 on the channel member is projected to guide the bar, and also located within the bar is a transverse slot 197 in alinement with the slot 194, but having a downturned cam portion 198 between its ends and an upturned cam bar 199 adjacent its outer end. A pin 200 on the channel member projects into the cam slot so that as the bar is moved inwardly in the direction of the arrow (Fig. XII) guiding travel of the bar over the pin causes the outer end of the bar to lift (dotted lines Fig. XIII) as the bar moves outwardly.

On the top of the bar and adjacent the outer end thereof is an inwardly facing hook 201 which normally lies below the plane of the crossed wires, but is adapted to lift with the block and pass over the wires during the inward movement of the bar, so that when the bar approaches the limit of its inward travel the hook will move over the crossed sections of wire and will be pressed downwardly by the shifting of the bar because of the guiding relation of the pin 200 with the cam portion 199 of the cam slot; the pressure being sufficient to clamp the wires together and prevent their slipping or escaping from the overlying relation.

In order to permit the hook to properly engage the cross-wires, I provide the needle point with a recess 203 in its rear face into which the hook projects as it moves to functional position. The bar 193 is moved inwardly to functional position by a cable 205 which is connected with the inner end of the bar and is run over a pulley 206 on the inner end of the channel member 191, over a pulley 207 on the stud 208 and is connected with a lever 209 that is pivotally mounted on an arm 210 of a standard 211, the free end of the said lever lying in the path of the needle point so that as the needle moves forwardly to carry the tie wire along the rear end of the bale, it first catches ring 176 to release the primary strand of the wire and effect a new clutch engagement with the part of the wire that is carried by the needle and afterward engages the lever 209 to clamp the cross wires together on the plate 191. The release of the primary strand, the clutching of the back strand and the clamping of the strands occur during the inward movement of the needle, so that by the time the needle reaches the full limit of its stroke, the cross-wires have been clamped and the back strand gripped. The final forward movement of the needle point carries the blade 167 on the needle point over which the wire is run against a cooperating blade 211' on post 211, so that the wire is severed. Following the severance of the wire, the needle point moves back out of the baling case, and as the clutch holds the wire, the latter is pulled through the needle aperture and lies across the baling case to be advanced by the end of an oncoming bale; the crossed wires of the formed bale being held by the hook 201.

The next operation is to tie the crossed ends of the wires. The operation of feeding and clamping the wires has been the same for the upper and lower wires so that the description heretofore given of the actuation on the upper wire has been the same in the lower wire, except that where I have mentioned upwardly facing parts, as when referring to the hook 201 of the upper wire members, the parts have been downwardly facing in the lower wire mechanism; the operation being the same, however, and the results being identical. When the wires are to be tied, however, the operations are performed by duplicate sets of parts that are operated from the lower needle point.

Referring more particularly to Figs. XIV to XIX inclusive, 212 designates a block that is mounted on the bottom of the auxiliary housing 192 and 213 a slide housing that is mounted on said block and extends in the same direction as the needle points and below the lower point 10; the said housing being divided horizontally by a partition 215 forming separate slide chambers 216—217, and having a slot 218 therein; the top of the housing having a slot 219 provided at its rear edge with an inclined surface 220.

Slidably mounted in the lower chamber 216 is a bar 221 having an upturned arm 222 at its rear end, provided at the top with a hinged tooth 223 that is adapted to yield forwardly against the tension of a leaf-spring 224 that is fixed to the body of the arm, but to seat rearwardly so that it is held rigid, for the purpose presently set forth.

The end of the tooth is beveled on its rear surface to form a point which is adapted for taking into a socket 226 (Fig. XIV) in the outer edge of the bottom needle point 10; the forward end of the socket being perpendicular to form a holding surface against the forward face of the tooth. The parts are so arranged that the tooth wipes the needle point when the latter moves forwardly and the tooth yields to allow the needle to pass. When the needle point moves back after performing its function, the tooth enters the needle socket and abuts against the holding face thereof, so that when the tooth is in place, it is pressed against its holding seat, and the tooth and the bar upon which it is mounted carried backwardly with the needle point, the bar sliding in its guide chamber.

Slidably mounted in the upper guide chamber 215 is a bar 228 having a tooth 229 pivotally connected therewith and provided with a point 230 that is adapted for projection through the partition slot 218 and for taking into a notch 231 in the upper edge of the lower slide bar 216, the tooth 229 being held yieldingly downward by a leaf-spring 233 on the top of the guide housing.

The slide bar 221 is hingedly connected with an extension 234, so that the member 221 may yield downwardly to escape the holding engagement with the needle point, and the tooth 229 is hinged to yield upwardly to escape its engagement with the member 221, the forward end of the tooth 229 being beveled to engage the beveled end 220 of the slot 219, so that when the tooth is carried forwardly it will engage the beveled end of the slot and automatically release from the bar 221.

Connected with the rear end of the bar extension 234 is a cable 236, and connected with the end of the bar 215 is a cable 237; the cable 236 having slack relative to the cable 237, so that when the bar 221 is moved rearwardly it will carry the tooth 229 along with it and immediately exert tension on the parts connected with the cable 237 while the slack is being taken up in the cable 236, it being apparent that the parts connected with the cable 236 will not be operated until after the operation of the parts connected with the cable 237.

The cable 237 runs over a pulley 240 (Fig. XV) that is mounted on the auxiliary housing, over a pulley 241 that is mounted on the stationary part attached to the housing, and is connected with a jaw arm 242 that is pivotally mounted in a standard 243 carried by the bottom of the housing. The arm 242 has a laterally projecting stud 245, and pivotally mounted on said stud is a jaw 246 that is arranged in substantial alinement with the lower primary or longitudinal tie wire, the said jaw having a nose 248 that is upturned, and provided with a guide channel 249, so that when the jaw is rocked upwardly the loose end C' of the primary strand of the lower wire strand A' will be seated in the channel and raised perpendicularly to the loose end D' of the transverse strand B' of the tie wire. This elevation of the jaw nose to bend the wire is effected by a pin 251 which is mounted on a stationary part of the housing and projects into a cam slot 252 in the jaw, so that when the jaw arm 242 is pivoted upon initial movement of its actuating mechanism the jaw will move forwardly and simultaneously rock on the pin 251 to throw the nose of the jaw against the loose end of the wire and bend the same perpendicularly to the wire which it crosses.

After the wire end C' has been bent up as described, it is turned downwardly to lie parallel with the body portion of the wire A', this downturning effect being also produced by the jaw 246.

The cam slot 252 has a downturned portion 254 at its end so that as the jaw arm 242 approaches the limit of its travel the end portion of the slot 252 is moved over the pin and rocks the free end of the jaw downwardly so that contact of the jaw with the wire is transferred from the upper edge of the nose around the end of the jaw and onto the ear 255, so that the loose end C' of the wire is moved back onto the body portion A' (Fig. XIX). To lap the free ends C—D of the upper bale wire strands A—B, duplicate mechanism is provided comprising a jaw arm 242' which is suspended from a hanger 243' carried by the top of the auxiliary housing, and having a stud 245' that carries a jaw 246', having the nose 248' provided with a channel corresponding with that in the nose of the lower jaw 246, having the cam slot 252' into which the pin 251' projects to effect the upward movement of the jaw that will bend the free end C of the upper tie wire A over the free end D of the back strand B of said upper wire, and having a jaw 255' that will bend said free end downwardly into alinement with the body of the strand B when the jaw is lowered by movement of the pin 251' into the cam portion 254' of the slot 252'.

The upper and lower jaws in the set just described operate simultaneously, for the reason that the upper end of the jaw arm 242 engages the upper arm 242', so that as soon as the lower jaw arm is operated the upper jaw arm is also operated to effect the simultaneous operation on the loose ends C—C' of the primary strands A—A' of the upper and lower tie wires. As soon as the free ends C—C' have been backlapped as described, the free ends D—D' are backlapped by a similar mechanism operated by the lower slide 221 (Fig. XIV) that is actuated upon return movement of the needle as heretofore described, the slack in the cable 237 being such that the jaws 246—246' will have completed their movement and returned to be out of the way of the second set of jaws before the said second set starts to operate, the return movement of the first set being effected by a spring 256 that is connected with the upper jaw arm 246' and with a post 257 on the auxiliary housing, which is tensioned when the jaw arms are moved forwardly so that it may return the arms when the latter are released.

Release of the first set of arms is effected by the tripping of the jaw 229 (Fig. XIV) which moves into engagement with the forward end of the slot in the housing 216 to effect its elevation and release from the lower bar 221, so that the first jaw set may effect a complete operation and return before the second set starts to operate. The second jaw set is operated by the cable 236 that is run over a grooved wheel 259 on the housing and a pulley wheel 260 on a fixed part of the housing and connects with the jaw arm 242$^A$ which, in turn, operates the jaw arm 242$^B$ of the upper set, the said arms carrying the jaws 246$^A$—246$^B$ that bend and lap the free ends D—D' of the back strands B—B' of the upper and lower tie wires. The upper jaw arm 242$^B$ has a spring 256$^A$ similar to the spring 256 of the primary set that returns both jaw arms after they have performed their functions. When the second set of jaw arms are returned they draw the actuating bar 221 (Fig. XIV) back to reset the parts so that they may operate upon a successive needle movement.

The next operation is to twist the lapped ends C—C' and D—D' over the body strands A—A', B—B'. This twisting is effected by split gear jaws 262—262', 262$^A$—262$^B$; the lower end of each of which is permanently located directly beneath a wire strand A—A', B—B' the clutches 142 holding the primary strands A—A' over jaws 262$^A$—262$^B$ and the needle running the strands B—B' over the jaws 262—262$^b$, so that when the strands D—D' are clamped (Fig. XI) they are held over the lower members of said jaws 262—262'.

Each of the split gear wheel clutches comprises a complete gear wheel that is divided on a diametrical line (Figs. XXI—XXII) to make up the jaw members 264—265 having a hinge 266 at the outer end of one of the gear teeth, so that the upper member 265 may open from the lower member. The upper and lower members have concentric spaced flanges 267—268 on their opposite faces forming annular channels 269 for receiving semi-circular rails 270 on the sides 271—272 of a channel member 273 that is fixed in the auxiliary housing, and for receiving the semi-circular rails 275 on the sides 276—277 of a head 280 that is carried by an arm 281. The arm 281 is pivotally connected with a link 282 which is pivotally mounted (at its opposite end) on a stud 283 on the auxiliary housing. The upper and lower split gear wheel clutches in each set are identical in construction and operation, the link 282 of the upper set and the link 284 of the lower set being both pivotally mounted on the stud 283; the said links having springs 285—286 secured to pins 287—288 on the housing to yieldingly retain the links outwardly and the split gear wheel clutches in open position.

It is apparent that with this arrangement when the links are held backwardly by their springs, the gear clutches are open, so that the wires may be extended over the lower gear members, but that when the links are moved against the tension of their springs, the gear members are closed to clutch the wires, and when closed the wheels may rotate on their rail mountings within the channel members 272—277 when actuated, as presently described.

Up to this point, all of the operating parts have been actuated by the needle which is driven from the shuttle and upon the initial return movement of the shuttle under tension of the spring 60 (Fig. IV). The wire twisting parts are also driven from the shuttle upon the return movement of the shuttle and after the needle operating gear wheel has left its engagement with the rack 63 (Fig. IV). The clutch 40, as before stated, locks to the gear wheel 37 (Fig. V) that meshes with the rack 46 on the shuttle when the shuttle is to be driven forwardly, but must release the gear wheel in order to permit backward movement of the shuttle. This release is effected by a trip mechanism comprising a lever 290 that is pivotally mounted at the outer end of the shuttle housing on a bracket 291 and has an arm 292 projected into the path of the shuttle for abutment thereby, and to which one end of a cable 293 is attached. The said cable 293 is connected at its opposite end with an arm 294 (Fig. VII) of a bell crank lever 295 that is pivotally mounted on a shuttle housing, and has a yoke 296 straddling the clutch collar 40 and provided with pins 297 that are projected into a groove 298 in the clutch collar 40, so that when the shuttle is at the rearward limit of its movement it engages the arm 291 and forces the clutch sleeve to coöperative engagement with the gear wheel 37, with the result that the shuttle is moved forwardly. As the shuttle approaches the forward limit of its travel it engages the arm 300 of the bell crank lever 301 and rocks the lever so that the arm draws on the cable 304 to rock the bell crank 295 and shift the clutch 40, thereby releasing the shuttle to the action of its spring, so that the shuttle is automatically returned to initial position.

In order to obviate displacement of the tie wires which may occur by backward expansion of the bale, I hold the shuttle forwardly until the baling plunger is pressed against the end of the bale, this retarding effect being produced by a trigger 306, (Fig. IV) that is pivotally mounted in the slot 56 of the shuttle housing and is adapted for engagement with a tooth 307 on the under side of the shuttle and at the forward end thereof, the latch being normally urged to holding position by a spring 308 that connects the latch with the shuttle housing. Connected with the arm of the latch opposite that which engages the tooth is a cable 309 which is connected at its opposite end with a trip 310 that is pivoted on a plate 311 that extends from the side of the baling case and is adapted for engagement by a boss 312 on the plunger 3, so that as the plunger comes into compression contact with the bale the trip will be rocked to draw the cable and release the shuttle, so that the latter may move back to initial position under tension of the spring.

To cushion return movement of the shuttle, I provide wiping arms 313 that are pivoted on the shuttle housing and have free ends projected across the housing channel to be engaged by the tapered end of the shuttle upon return movement of the latter; the arms being urged to functional position by springs 31, that engage the butt ends of the arms that are carried by the shuttle housing.

Upon return movement of the shuttle the rack 107 engages the gear wheel 109 as described so that the shaft 120 is revolved and the beveled gear wheel 315 on said shaft meshing with the gear wheel 316 on a cross shaft 317 (Fig. III) rotates the latter shaft.

The shaft 317 is revolubly mounted in suspended bearings 318 on the baling case extension and on the housing 192', and carries a beveled gear wheel 319 that meshes with a similar gear wheel 320 on a vertical shaft 321 that is revolubly mounted in bearings 322 on the auxiliary housing. On its upper end the shaft 321 carries a beveled gear wheel 324 that meshes with a similar wheel 325 on a horizontal shaft 326 that is revolubly mounted in bearings 327 on the outer side of the auxiliary housing, and fixed to said shaft within the housing is a large gear wheel 329 having an interior beveled gear face 330. The gear wheel 329 is arranged diagonally to the baling case and is adapted for meshing with the separate gear wheels 332 in the separate sets of wire tying mechanism, which sets are, as before stated, arranged at right angles to each other so that the single driving gear wheel 329 operates both of the sets of tying parts.

The gear wheels 332—332' operate to rotate the split gear clutches, but before the clutches operate it is necessary to close the split wheels in order that they may clutch the lapped wires. This closing is effected by a vertical bar 334 (Figs. X–XVI) which is slidably mounted in apertures 335—335' in the top and bottom of the auxiliary housing, and has a pin 336 fixed thereto, and extending laterally into the cupped gear wheel. The pin 336 carries a roller 337 that rides on a cam 338 on the inner face of the large gear wheel 329, and has a pocket 339 in its periphery within which the roller seats when the parts are in normal position, so that the bar 334 is at the lower limit of its movement. Also fixed on said bar is a pin 341, and rotatable on said pin are rollers 342—343 which engage the arms 344—344' of levers 345—345' that are pivotally mounted on brackets 346—346' that are carried by the auxiliary housing.

As the construction and operation of said levers are identical, I will proceed to describe but one, with the understanding that this description relates equally to both.

The lever 345 has a yoke 347 that extends over the gear wheel 332, and connected with the free end of said yoke are cables 349 and 350 which run over rollers 351—352 carried by the housing and connect respectively with the upper and lower clutch closing links 282—284.

With this arrangement, when the driving gear wheel 329 starts its operation, the lifting bar is moved upwardly because the cam engages the roller on the lifting bar to carry the roller out of the cam pocket, and as the bar lifts the rollers 342—342' engage the lever arms 344—344' and rock the levers to lower the yokes. This lowering of the yokes induces a pull on the cables 349—350 and draws the links 282—284, and the corresponding links in the other set, against the tension of their springs, thereby swinging the movable members of the split gears toward the stationary members and closing the clutch. The split gears are held in clutch relation while the driving gear wheels nearly complete a revolution, or until the roller 337 starts down again into the cam pocket. It is while the split gear wheels are thus held closed that the said gear clutches are revolved to twist the wire. This revolution of the split gear wheels is induced by the gear wheel 332 which has a large gear wheel 353 rigidly connected therewith. The gear wheel 353 meshes with the pinions 354—354' which, in turn, mesh with the split gear wheels 262—262, so that the split gear wheels are revolved to twist the free ends of the tie wires about the body portions thereof to tie the wires about the bale.

The split gear wheels are preferably so proportioned relative to the driving gears that they will make four complete revolutions for each single revolution of the driving gear and will terminate their travel at their initial position. The lines of separation are horizontal in order that the wires may be properly placed thereover upon a succeeding operation of the apparatus.

As before stated, the crossed wires are clamped by the hook 201 (Figs. XII and XIII), this clamping remaining effective until the tying is completed, when the clamp is removed by the following mechanism:

356 (Figs. XII-XIII) designates a slide case which is fixed in the auxiliary housing adjacent each of the clamp slides 193. Slidably mounted in said case is a bar 357 having a cable 358 run over a pulley 359 within the auxiliary housing and connected with the lift bar 334, so that when the bar is raised, the cables are drawn to actuate the slides 357. Each of the slides has a hook 360 pivoted thereto and adapted for seating in a notch 361 in a relative clamp slide 193, the hook being yieldingly urged to position for engaging the clamp slide and a flat spring 369 being adapted for engagement by the end of the slide case to straighten the hook and disconnect the same from the clamp slide.

Each of the slides 357 has a spring 370 connected therewith and with a pin 371 on the housing to draw the slide outwardly to position for engaging the clamp slide when the cable 358 is released by upward movement of the lift bar.

With this arrangement when the lift bar is down as it is when the parts are in normal position, each slide 357 is back and its hook disconnected from the clamp bar. When the parts have operated and the clamp bar moved out to clamp the crossed wires, the hooks do not interfere with the clamping movement. When the tying is effected, however, and the lift bar moves upwardly the cables are released so that the slides 357 are drawn out by their springs and the hooks move upwardly to position for engaging the clamp slides. Upon the movement of the lift bar back to normal, the cables are drawn and pull the slides 357 so that the latter hook onto the clamp slides and draw the same back to remove the hooks from the crossed wires.

Briefly describing the operation of the apparatus as applied to a hay baler, the tie wires on the storage spools are threaded through the needle points, run across the compression chamber and connecting with the clutches 141 at upper and lower positions relative to the bale. Hay is then fed into the press, through the hopper and forced forwardly by the plunger the compression chamber of the case retarding movement of the hay, so that it is compacted while being formed. As the bale grows and moves forwardly it operates the hook chain 19 which, in turn, operates the shaft 32 that advances the shuttle, the parts being neutralized if desired to prevent the operation of the tying mechanism upon initial forward movement of the shuttle as there is no necessity for initial twisting. As the bale progresses the shuttle is carried forwardly until it reaches its forward limit when the bale is built up to its desired length. As the shuttle reaches its forward limit it trips the forward latch 301 to disconnect the driving clutch in the shaft 32, so that the shuttle is free to be returned under tension of its spring 60. The shuttle is held, however, when first freed by the trigger 306, until the plunger moves forwardly into contact with the rear end of the bale and trips the trigger to release the shuttle. As soon as the shuttle is released, it shoots back under tension of the spring and the upper rack 63 engages the gear wheel on the shaft 66 to rotate the latter. The rotation of this shaft carries the segmental gear wheel 69 with it; the first movement of the gear wheel operating the drum 86 to drive the needle transversely across the back of the bale. As the tie wires were located transversely of the baling chamber and in the path of the bale, the wires have been drawn out by the bale being pushed thereagainst, so that they inclose both sides and the front end thereof. As the needle is driven across the baling chamber it carries the wires that are to inclose the rear end of the bale, and also carries the wires across the split gear wheels at right angles to the bale; the back strands of the wires crossing the initial side strands over the clamp plates heretofore described, and the ends of the needle points catching the cable rings 176 and abutting the lever 209 to first actuate the clutch 141 to release the initial strand and cause the gripping of the back strand at a point adjacent the aperture 139. This leaves the free ends of the tie wires crossed on the clamp channel plate, and continued movement of the needle points rocks the levers 209 to throw the clamp hooks over the crossed wires to hold the same in place, final movement of the needle points bringing the blades 167—211' together to sever the wire. The needle is then moved backwardly as the initial segment of the segmental gear wheel has left its engagement with the gear wheel 180 and taken up engagement with the gear wheel 194, so that the drum shaft 81 is revolved in the opposite direction to throw the needle back out of the baling chamber.

As the wires have been gripped in the clutches as described, the ends of the wires are held so that they form strands across the baling chamber, against which an oncoming bale may abut; the former end strands being clamped on the clamp plate. The needle points upon their backward movement are engaged by the slide arms 222 (Fig. XIV), which serve to first rock the jaws 246, etc., to bend the wires up and lap them back over their body strands, the bending and lapping in the duplicate sets of mechanisms being successive, so that the parts will not interfere with each other, and the connection of the slide members with the needle points terminating automatically as soon as the lapping has been effected, so that the jaw parts may be automatically returned to initial position.

As soon as the lapping has been effected, the shuttle rack 63 will have left its contact with the gear wheel 65 and the rack 107 will start its engagement with the gear wheel 109, so that the large driving gear wheel 329 is operated to first close the split gear clutches over the lapped tie wires and then rotate the clutches to twist the wires. The large driving gear wheel makes but one revolution and as it completes its revolution the lift bar 334 is again lowered to permit the gear clutch jaws to open and to draw the clamp slides back to release the clamps, so that all of the parts are returned to normal or initial position and ready for a successive operation so that a new bale may be formed. The operation is continuous, however, so that the hay may be fed to the press without interruption, and the mechanism determines the length of the bale, so that all the bales are of uniform size.

Having thus described my invention, what I claim as new therein, and desire to secure by Letters-Patent, is:—

1. The combination with a baling case, of means at one side of the case for holding a wire, a guide movable from the opposite side of the case to carry the wire across the held portion, and means for back lapping the crossed portions of the wire.

2. The combination with a baling case, of means at one side of the case for holding a wire, a guide movable from the opposite side of the case to carry the wire across the held portion, a clamp for holding the crossed portions of the wire, and means for back lapping the free ends onto the clamped portions of the wire.

3. The combination with a baling case, of means at one side of the case for holding a wire, a guide movable from the opposite side of the case to carry the wire across the held portion, means for back lapping the crossed portions of the wire, and means for twisting lapped portions of the wire.

4. The combination with a baling case, of means at one side of the case for holding a wire, a guide movable from the opposite side of the case to carry the wire across the held portion, a clamp for holding the crossed portions of the wire, means for back lapping the free ends onto the clamped portions of the wire, and means for twisting lapped portions of the wire.

5. The combination with a baling case, of wire placing and wire tying mechanisms, a single prime mover for first placing and then tying the wire, means operable by material in the case for setting the prime mover, a latch for holding the prime mover, and a plunger in the case adapted for actuating said latch to release the prime mover.

6. The combination with a baling case, of a wire clutch at one side of the case, a needle having a wire guiding portion, movable across the case from the side opposite the clutch and automatically reversible driving mechanism operatively connected with the needle.

7. The combination with a baling case, of a wire clutch at one side of the case, a needle having a wire guiding portion, movable across the case from the side opposite the clutch, a prime mover, a driven element operatively connected with the needle, and automatically reversing transmission between the prime mover and driven element.

8. The combination with a baling case, of a wire clutch at one side of the case, a needle having a wire guiding portion, movable across the case from the side opposite the clutch, a shaft, connection between the shaft and needle, reversely arranged gears operatively connected with the shaft, and means for sequentially actuating the gears to reciprocate the needle.

9. The combination with a baling case, of a wire clutch at one side of the case, a needle having a wire guiding portion, movable across the case from the side opposite the clutch, a shaft, connection between the shaft and needle, reversely arranged gears operatively connected with the shaft, a driving wheel having separate gear segments, adapted for sequentially engaging the gears, and means for actuating the segmental gear wheel.

10. The combination with a baling case, of a wire clutch at one side of the case, a needle having a wire guiding portion, movable across the case from the side opposite the clutch, a shaft, connection between the shaft and needle, reversely arranged gears operatively connected with the shaft, a driving wheel having separate gear segments on its opposite faces adapted for sequentially engaging the gears, and means for actuating the segmental gear wheel.

11. The combination with a baling case, of a wire clutch at one side of the case, a needle having a wire guiding portion, movable across the case from the side opposite the clutch, a shaft, a drum on the shaft, reversely arranged flexible connections between the drum and needle, and automatically reversible means for driving the shaft.

12. The combination with a baling case, of means at one side of the case for holding a wire, a needle for carrying the wire toward and from the clutch, a reciprocatory shuttle, means for actuating the shuttle, means operable by material in the case for setting the shuttle, and means operable by the shuttle for actuating the needle.

13. The combination with a baling case, of wire guiding and wire tying elements, a shuttle, and means operable by the shuttle for sequentially operating the wire guiding and wire tying elements.

14. The combination with a baling case, of wire guiding and wire tying elements, a shuttle, means operable by the shuttle for sequentially operating the wire guiding and wire tying elements, and means operable by material in the case for controlling the shuttle.

15. The combination with a baling case, of wire guiding and wire tying elements, a shuttle, means operable by the shuttle for sequentially operating the wire guiding and wire tying elements, a spring for actuating the shuttle, and means operable by material in the case for setting the shuttle against the tension of said spring.

16. The combination with a baling case, of wire guiding and wire tying elements, a shuttle, means operable by the shuttle for sequentially operating the wire guiding and wire tying elements, a spring for actuating the shuttle, means operable by material in the case for setting the shuttle against the tension of said spring, a latch for holding the shuttle, a plunger in the baling case, and means operable by the plunger for actuating said latch.

17. The combination with a baling case, of wire guiding and wire tying parts, a shuttle having separate rack members, means for actuating the shuttle, and means operable sequentially by the separate rack members for actuating the guiding and tying parts.

18. The combination with a baling case, of wire guiding and wire tying parts, a shuttle having separate rack members, means for actuating the shuttle, means operable sequentially by the separate rack members for actuating the guiding and tying parts, and means operable by material in the baling case for setting the shuttle.

19. The combination with a baling case, of wire guiding and wire tying parts, a shuttle having separate rack members, means for actuating the shuttle, means operable sequentially by the separate rack members for actuating the guiding and tying parts, a third rack member on the shuttle, a gear wheel operatively engaging the third rack member, and means operable by material in the case for driving said gear wheel.

20. The combination with a baling case, of wire guiding and wire tying parts, a shuttle having separate rack members, means for actuating the shuttle, means operable sequentially by the separate rack members for actuating the guiding and tying parts, a third rack member on the shuttle, a gear wheel operatively engaging the third rack member, means operable by material in the case for driving said gear wheel, a clutch for controlling the gear wheel, and means operable by the shuttle for controlling the clutch.

21. The combination with a baling case, of wire guiding and wire tying parts, a shuttle, a spring for urging the shuttle in one direction, a rack on the shuttle, a gear wheel meshing with said rack, means operable by material in the case for actuating the gear wheel to set said shuttle, a second rack on the shuttle, means operable by the second rack for actuating the wire guiding parts, a third rack on the shuttle, and means operable by the third rack for actuating the wire tying parts.

22. The combination with a baling case, of wire guiding and wire tying parts, a shuttle, a spring for urging the shuttle in one direction, a rack on the shuttle, a gear wheel meshing with said rack, means operable by material in the case for actuating the gear wheel to set said shuttle, a second rack on the shuttle, means operable by the second rack for actuating the wire guiding parts, a third rack on the shuttle, means operable by the third rack for actuating the wire tying parts, a clutch for operatively connecting the said gear wheel with its actuating means, a shifter lever for said clutch, latches for engagement by opposite ends of the shuttle, and connections between said shifter lever and the latches.

23. In a wire tying mechanism, a clutch comprising a fixed and a movable jaw, means for actuating the movable jaw sequentially to release and grip a wire, and means for shifting the clutch sequentially to raise and lower the wire.

24. The combination with a baling case, of a clutch comprising a fixed and a movable jaw, a needle for carrying a wire to the clutch, and means operable by the needle to cause one of the clutch jaws to release the wire and sequentially to grip the wire.

25. The combination with a baling case, of a clutch comprising a movable arm, having a fixed jaw thereon and a movable jaw adapted for coöperation therewith, a needle for carrying a wire to the clutch, a cable secured to the jaw arm, a ring secured to the cable, and means on the needle for catching the cable ring to shift the clutch.

26. The combination with a baling case, of a clutch comprising a fixed and a movable jaw, a needle for carrying a wire to the clutch, means operable by the needle for shifting the clutch, and a spring member for returning the clutch to initial position.

27. The combination with a baling case, of a clutch having a fixed and movable jaw, a needle for carrying a wire to the clutch, means operable by the needle for shifting the clutch, a cam member for engagement by the jaws to actuate the same when the clutch is shifted, a member of the movable jaw being movable laterally and in the direction of its mating member, for the purpose set forth.

28. In a wire tying apparatus, a clutch comprising a movable arm adapted for sliding in a fixed housing, a fixed jaw on the end of said arm and a movable jaw adapted to coöperate therewith, a needle for conducting a wire adjacent the clutch, means operable by the needle for actuating the clutching jaw, and means for tying the wire.

29. In a wire tying apparatus, a clutch comprising a fixed and a movable member, a slidable arm for raising and lowering said clutch, means on the said arm for actuating the movable jaw, a needle for conducting a wire adjacent the clutch and across a part of the wire previously held by the clutch, means operable by the needle for actuating the clutch to effect release of the previously held part of the wire and gripping of an oncoming part, means on the needle for cutting the wire, and means for tying the wire.

30. The combination with wire holding and guiding mechanism, of a reciprocatory clamp bar, means on the clamp bar for clamping the wire, means operable by the guiding mechanism for shifting the clamp bar, and means operating on the clamp bar to rock the same during its reciprocatory travel.

31. The combination with wire holding and guiding mechanism, of a reciprocatory clamp bar, means on the clamp bar for clamping the wire, means operable by the guiding mechanism for shifting the clamp bar, the clamp bar having a cam slot and a pin projected into the cam slot to rock the bar.

32. The combination with wire holding and guiding mechanisms, of a reciprocatory clamp bar having a cam slot and a guide slot, fixed pins projected into said slots, a hook on the clamp bar for overlying the wire, and means operable by the guiding mechanism for moving the clamp bar to functional position.

33. The combination with wire holding and guiding mechanisms, of a reciprocatory clamp bar having a cam slot and a guide slot, fixed pins projected into said slots, a hook on the clamp bar for overlying the wire, means operable by the guiding mechanism for moving the clamp bar to functional position, wire tying mechanism, and means operable by the tying mechanism for returning the clamp bar.

34. The combination with wire holding and guiding mechanisms, of a reciprocatory clamp bar having a cam slot and a guide slot, fixed pins projected into said slots, a hook on the clamp bar for overlying the wire, a lever operable by the guiding mechanism, and connection between the lever and clamp bar to move the clamp bar to functional position.

35. The combination with wire holding and guiding mechanisms, of a reciprocatory clamp bar having a cam slot and a guide slot, fixed pins projecting into said slots, a hook on the clamp bar for overlying the wire, a lever operable by the guiding mechanism, connection between the lever and clamp bar to move the clamp bar to functional position, wire tying mechanism, and means operable by the tying mechanism and connected with the clamp bar to return the bar.

36. The combination with means for holding a wire with its ends crossed, of pivotally mounted jaws, having cam slots, pins projected into said slots, and means for rocking the jaws to back lap the wires.

37. The combination with means for holding a wire with its ends crossed, of pivotally mounted jaws, having cam slots, pins projected into said slots, means for rocking the jaws to back lap the wires, and rotatable clutches for gripping and twisting the back lapped wires.

38. The combination with means for holding a wire with its ends crossed, of pivotally mounted jaws, having cam slots having grooved noses and back hooked end lips, pins projected into said slots, means for rocking the jaws to back lap the wires, and rotatable clutches for gripping and twisting the back lapped wires.

39. The combination with means for holding a wire, of means for guiding a part of the wire across the held part, jaws arranged to engage the ends of the wire, pivotally mounted arms operatively connected with the jaws, means for guiding the jaws, and means operatively connecting the jaws with the wire guiding means.

40. The combination with means for holding a wire, of means for guiding a part of the wire across the held part, jaws arranged to engage the ends of the wire, pivotally mounted arms operatively connected with the jaws, means for guiding the jaws, means operatively connecting the jaws with the wire guiding means, whereby the jaws are operated upon return movement of said guiding means.

41. The combination with means for holding a wire, of reciprocatory means for guiding a part of the wire across the held part, jaws for back lapping the wire, pivotally mounted arms, operatively connected with the jaws, means for guiding the jaws, slide mechanism, operable by the guiding means, and connection between the slide mechanism and said arms for operating said jaws.

42. The combination with means for holding a wire with its ends crossed, of independent sets of wire turning parts, each having a jaw located to engage an end of the wire, and means for sequentially actuating said sets to first back lap one end of the wire and then back lap the other end of the wire.

43. The combination with means for holding a wire with its ends crossed, of independent sets of wire turning parts, each having a jaw located to engage an end of the wire, means for sequentially actuating said sets to first back lap one end of the wire and then back lap the other end of the wire, said actuating means comprising a slide having slack connection with one of said sets, means operable by said slide for actuating the other set, means for disconnecting said last named means from the slide, and means for actuating the slide.

44. The combination with a wire clutch, of a needle for carrying the wire across a clutched part thereof, jaws for back lapping the crossed wires, means operable by the needle for actuating the jaws, wire twisting mechanism, a prime mover, and separate means operable by the prime mover for sequentially operating the needle and the twisting mechanism.

45. The combination with a baling case, of a plunger operable in the case, wire placing mechanism, wire tying mechanism, a prime mover, means operable by material in the case for setting the prime mover, means operable by the plunger for releasing the prime mover, and means operable by the prime mover to first place a wire and then tie the wire.

46. The combination with wire placing mechanism, of wire twisting mechanism comprising a split wheel, means for closing and opening the wheel to clutch and release the wire, and means for rotating the wheel when closed.

47. The combination with wire placing mechanism, of wire twisting mechanism comprising a split gear wheel, means for closing and opening the wheel to clutch and release a wire, a driving gear wheel in constant mesh with the clutch gear wheel, and means for actuating the driving gear wheel.

48. The combination with wire placing mechanism, of wire twisting mechanism comprising a split gear wheel hinged at one edge, means for closing and opening the wheel to clutch and release a wire, a driving gear wheel in constant mesh with the clutch gear wheel, and means for actuating the driving gear wheel.

49. The combination with a bracket having an arcuatile rail, of a split gear wheel hinged at one edge and having flanges in guiding relation with said rail, a carrier for the other wheel member, means for placing wire over the first wheel member, means for turning back a wire end over said member, means for closing the gear wheel, and means for rotating the wheel.

50. The combination with a hinged, split gear wheel, of means for supporting the members of said wheel to permit rotary movement of the wheel when closed, one of the supports being movable, a driven gear wheel meshing with the split gear wheel, a driving gear wheel meshing with the driven wheel, a cam on the driving gear wheel, means for carrying wire between the members of the split wheel, and means operable by the cam for actuating said movable support.

51. The combination with a hinged, split gear wheel, of means for supporting the members of said wheel to permit rotary movement of the wheel when closed, one of the supports being movable, a driven gear wheel meshing with the split gear wheel, a driving gear wheel meshing with the driven wheel, a cam on the driving gear wheel, means for carrying wire between the members of the split wheel, a lever adapted for engaging the movable support, a lift bar, means on the lift bar for engaging the cam to effect operation of the bar, and means on the bar for engaging the cam.

52. The combination with a hinged, split gear wheel, of means for supporting the members of said wheel to permit rotary movement of the wheel when closed, one of the supports being movable, a driven gear wheel meshing with the split gear wheel, a driving gear wheel meshing with the driven wheel, a cam on the driving gear wheel, means for carrying wire between the members of the split wheel, a lever adapted for engaging the movable support, a lift bar, means on the lift bar for engaging the cam to effect operation of the bar, means on the bar for engaging the cam, a clamp for holding said wire, means for setting the clamp, and means operable by the bar for returning the clamp.

53. The combination with duplicate sets of wire twisting devices arranged at an angle to each other and each comprising a driving gear wheel, a master gear wheel meshing with the driving wheels of both sets, and means for operating the master wheel.

54. The combination with duplicate sets of wire twisting devices arranged at an angle to each other and each comprising a split member and a driving gear wheel, a master gear wheel meshing with the driving gear wheels in both sets, and means operable by the master gear wheel for closing and opening the split member.

In testimony whereof I affix my signature.

EDWARD G. PADDECK.